United States Patent [19]

Yamamoto et al.

[11] 3,865,987

[45] Feb. 11, 1975

[54] AUTOMATIC TELEPHONE ANSWERING SYSTEM WITH VARIABLE SPEED DRIVE CONTROL

[75] Inventors: Kozo Yamamoto; Isao Shinohara, both of Osaka, Japan

[73] Assignee: Matsushita Electric Industrial Co., Ltd., Kadoma-shi, Osaka, Japan

[22] Filed: May 22, 1973

[21] Appl. No.: 362,936

[30] Foreign Application Priority Data

| | | |
|---|---|---|
| May 25, 1972 | Japan | 47-52089 |
| June 20, 1972 | Japan | 47-73547 |
| June 20, 1972 | Japan | 47-73548 |

[52] U.S. Cl. .................... 179/6 R, 360/73, 360/78, 360/106

[51] Int. Cl. ..... H04m 1/64, G11b 5/48, G11b 21/08

[58] Field of Search ....... 179/6 R, 100.1 S, 100.2 R, 179/100.2 S, 100.2 MD; 35/35 C, 9 A, 8 A; 360/73, 106, 62, 63

[56] References Cited

UNITED STATES PATENTS

| | | | |
|---|---|---|---|
| 2,937,237 | 5/1960 | Zanardo | 176/6 AC |
| 3,344,234 | 9/1967 | Salzberg et al. | 179/6 R |
| 3,501,851 | 3/1970 | Price, Jr. et al. | 35/9 A |
| 3,586,789 | 6/1971 | Butcher et al. | 360/73 |
| 3,590,159 | 6/1971 | Wolf et al. | 179/6 R |
| 3,702,506 | 11/1972 | Goshima et al. | 35/35 C |

*Primary Examiner*—Raymond F. Cardillo, Jr.
*Assistant Examiner*—David K. Moore
*Attorney, Agent, or Firm*—Wenderoth, Lind & Ponack

[57] ABSTRACT

An automatic telephone answering system employing a multichannel, endless magnetic tape comprising one channel for the playback of a previously recorded answer to callers and a plurality of channels for the recording of messages from callers, wherein a speed control means causes the tape to be driven more slowly during recording of messages than during playback of an answer, and a warning means gives a warning to callers some time before the end of recording of messages.

1 Claim, 11 Drawing Figures

AUTOMATIC TELEPHONE ANSWERING SYSTEM WITH VARIABLE SPEED DRIVE CONTROL

Figure 1:
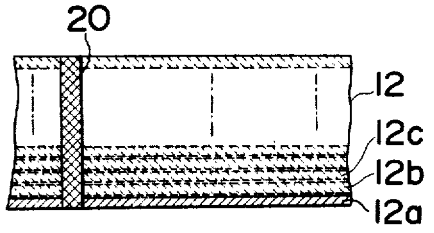

The present invention relates to an automatic telephone answering system, and more particularly to a telephone answering system wherein a single tape is used both for the playing of an answer to callers and for the recording of messages from callers. According to the invention, the time available for recording one message is made several times longer than the time necessary for playing a recorded answer, and a caller recording a message may be given a warning when the amount of available tape is almost finished.

It is common commercial practice to employ an automatic telephone answering system, principally for use when there are no staff present to answer a telephone. When a call is made to a telephone fitted with such a system, an answer, which has been previously recorded on a magnetic tape, is played to the caller. When the answer has been played back, the caller may record a message. Messages and the answer may be recorded on the same tape or on separate tapes. Conventionally such a system employs a multitrack, endless magnetic tape. The tape is run once round its complete length each time the answer is played, or a message recorded, messages being recorded on successive tracks. A principal disadvantage associated with such conventional means is that the message recording tim and the answer playing time are the same. As an improvement, there has been provided a system wherein two or more complete tracks are made available for recording a message. But this system has the disadvantage that the number of messages that can be recorded on the provided tape is reduced. In another system, the tape is simply made longer. But this has the disadvantage that the answer playing time is also increased. In addition, a common experience with such conventional automatic telephone answering systems is that a caller is often still recording a message when the available tape comes to an end. This presents obvious disadvantages for persons using such systems. Similarly, in a conventional telephone answering system employing an endless tape accommodated freely in a case, neither stable running of the tape not good contact between a magnetic head and the tape can be obtained unless proper stretch is applied to the tape, and without good contact between the head and the tape, variations in recording level, wow flutter or uneven recording may result.

It is according an essential object of the present invention to provide an automatic telephone answering system, which is economical and efficient, and wherein the time available for recording a message is made several times longer than the time necessary for playing an answer.

It is another important object of the present invention to provide an improved automatic telephone answering system whereby a caller recording a message is given a warning some time before the available tape for recording a message comes to an end. It is further object of the present invention to provide a considerable improvement over conventional automatic telephone answering system, and this improvement is provided by means that is compact, inexpensive, and easily adjustable.

According to the invention, there is provided an multitrack, endless magnetic tape. One track is used for playing a previously recorded answer, and a message may be recoreded on each of the other tracks. A conductive strip is applied to the tape, whereby it may be detected each time one track is completed. Each time the strip is detected, the subsequent speed of the tape is changed. The tape is driven more slowly when a message is being recorded than when an answer is being played. Thus, on the same tape, and using a track of the same length more time is made available for messages.

In addition thereto, there is provided according to the present invention a tape position detection means wherein a strip of detectable material, such as aluminum foil, is attaached to a magnetic tape at a set distance from the end thereof. The tape is run past a first detector and a second detector, which are positioned at different points on the path of the tape, and which detect the marking strip. Since the tape speed, the distance of the strip from the end of the tape, and the location of the first and second detectors may all be known, the amount of tape recording time left when the strip is detected by the first or second detector is easily determined. For use of the tape position detection means in an automatic telephone answering system, the first detector actuates a buzzer or similar warning, and the second detector caused the tape drive to be stopped.

Also, in another embodiment, there is provided according to the present invention a tape position detection means for an automatic telephone answering system wherein a magnetic tape is marked in two locations with strips of detectable material, such as aluminum foil. One strip is detected by a first detection element, which gives a warning to a caller. The other strip is detected a set time later by a second detection element, which causes the tape to be stopped. The warning may be given when there is, for example, 10 or 20 seconds recording time left, and the tape is stopped automatically 10 or 20 seconds after the warning. Furthermore, according to the invention, the first detector which actuates the warning means, is disposed on the trailing side of the first and second magnetic heads, a capstan and a pinch roller with respect to the direction of advance of the tape in order to give the tape proper stretch, said first detector being positioned on the trailing side of a guide pulley provided on the trailing side of the first magnetic head to prevent the tape from slipping off the guide pulley.

The provision of the first detector on the trailing side of the first and second heads, the capstan and the pinch roller with respect to the direction of advance of the tape gives proper stretch to the magnetic tape, resulting in stable running of the tape and good contact between the head and the tape without variations in recording level, wow flutter or uneven recording.

Figure 2:
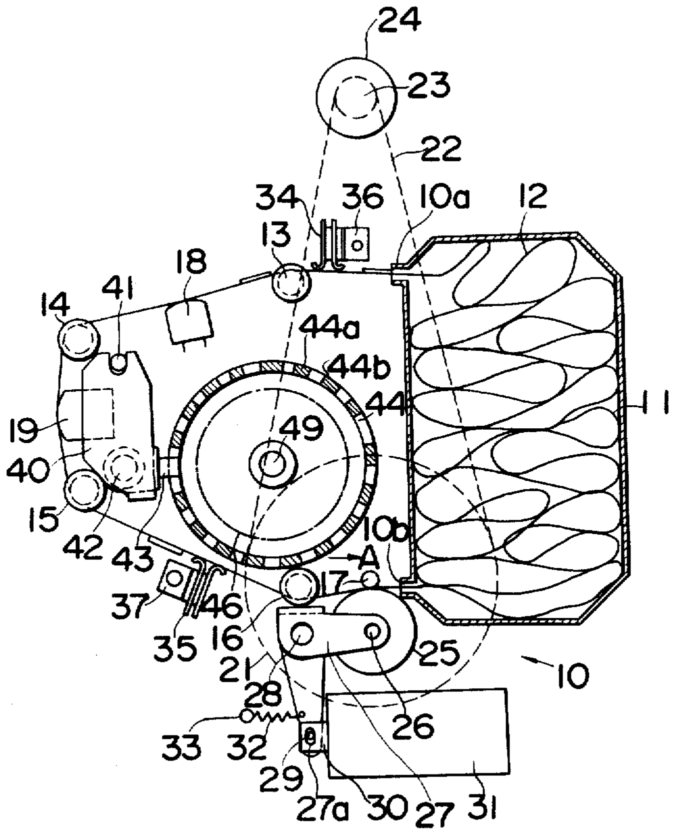
Figure 3:
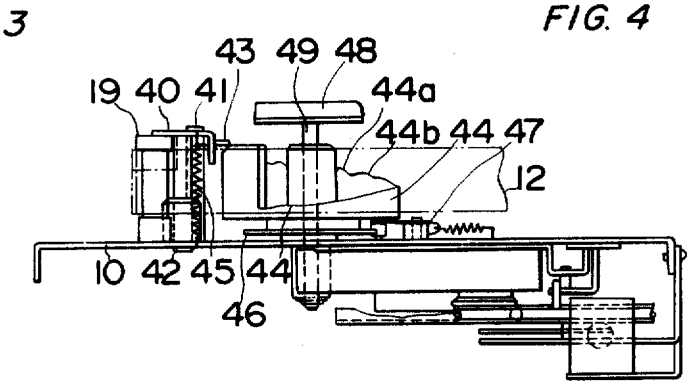
Figure 4:
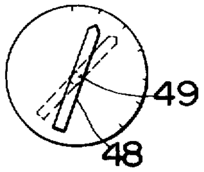
Figure 5:
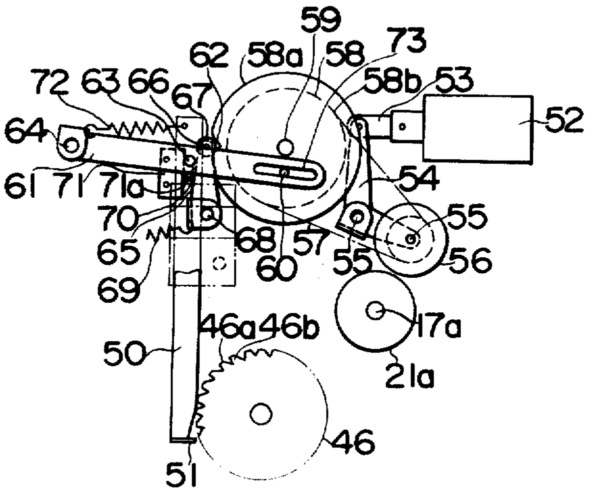
Figure 6:
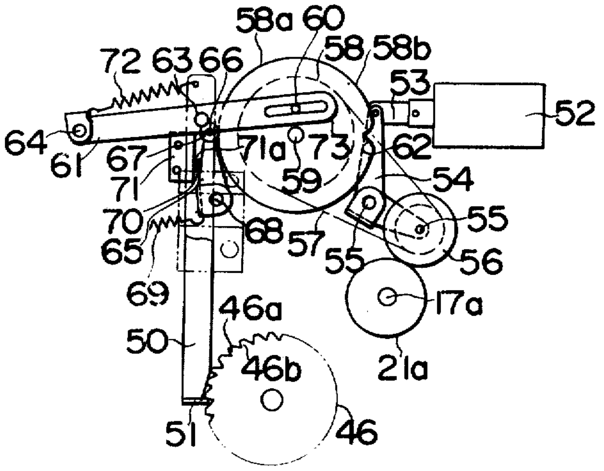
Figure 7:
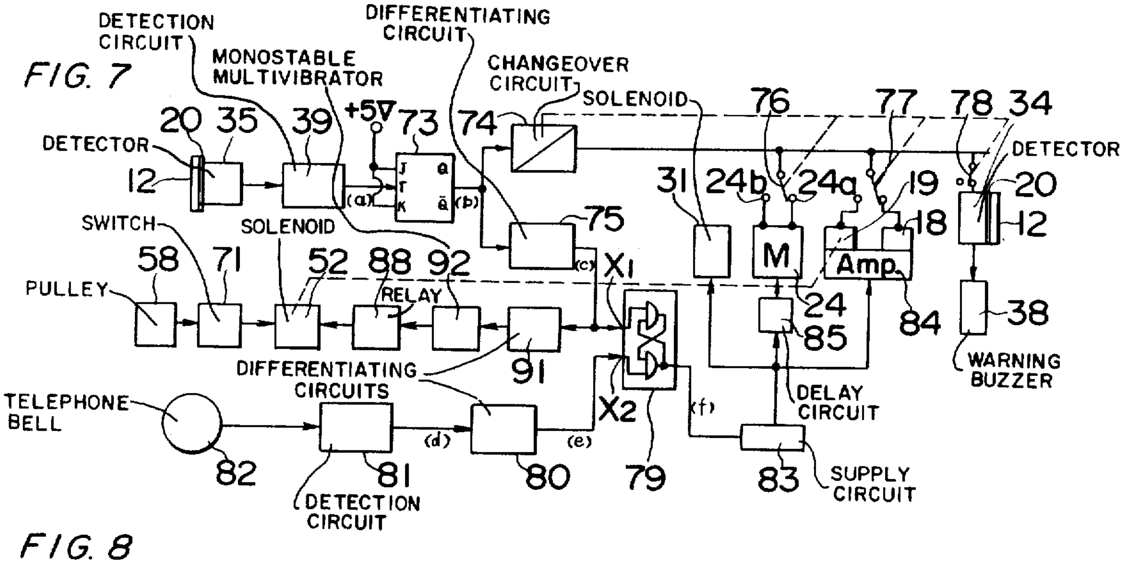
Figure 8:
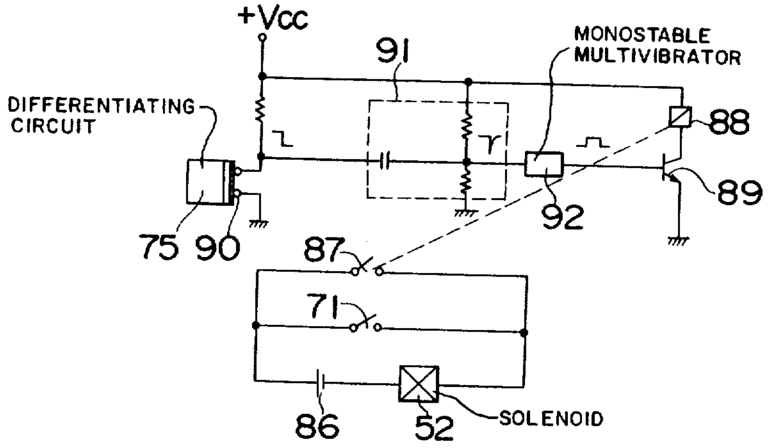
Figure 9:
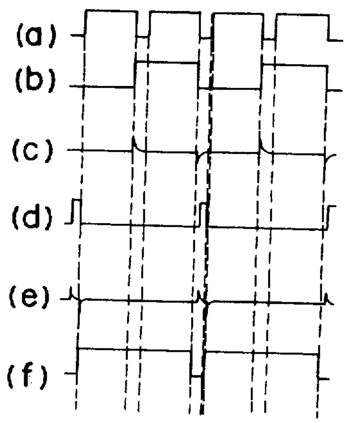
Figure 10:
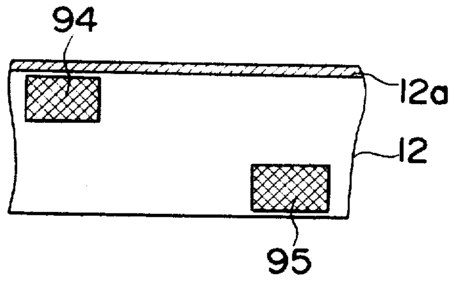
Figure 11:
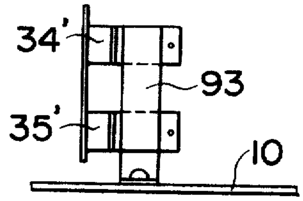

These and other objects and features of the present invention will become apparent from the following description taken in conjunction with preferred embodiments thereof, in which;

FIG. 1 is a plane view of an endless magnetic tape as used in a system according to the present invention, FIG. 2 is a schematic plane view, partically in section, of the equipment in one embodiment of the present invention, for only the purpose of showing essential components thereof, FIG. 3 is a side view of a magnetic head shift mechanism employed in the embodiment of FIG. 2, FIG. 4 is a plane view of an indicator for showing the number of messages received, FIG. 5 is a plane view of the magnetic head shift mechanism when not actuated, FIG. 6 is a plane view of the magnetic head shift mechanism when actuated, FIG. 7 is a schematic block diagram of a circuit used in the embodiment of FIG. 2, FIG. 8 is an electrical block diagram of a solenoid switching circuit of FIG. 7, FIG. 9 illustrates waveforms obtained in the circuit shown in FIG. 7, FIG. 10 shows the location of detection elements on a magnetic tape according to a second embodiment of the present invention, and FIG. 11 is a side view of detectors and a detector mount according to the second embodiment of the invention.

Referring first to FIGS. 1 to 6, there is shown a baseboard 10 to which is attached a case 11. An endless, multitrack magnetic tape 12 is coiled within the case 11, passed through an opening 10*a* at one end of the case 10, passed around guide pulleys 13, 14, 15, 16, and round a capstan 17, and then again enters the case 10, through an opening 10*b* at the other end thereof.

The first channel 12*a*, that is, the outside track of this magnetic tape 12 is employed for the playing of an automatic answer, and playback of a previously recorded answer on the tape to callers is effected by means of a first playback head 18 fixedly provided along the moving course of the tape 12 between the guide pulleys 13, 14. The remainder of the tape 12 is divided into channels 12*b*, 12*c* ... for recording and playback of messages from callers. Recording and playback of messages on the tape 12 is effected by means of a second playback recording head 19 movably provided along the moving course of the tape 12 between the guide pulley 14, 15. One channel, extending the whole length of the tape 12 is available for each recorded message. For each successive recorded message the second head 19 is moved to a subsequent channel in a manner described below. Attached to the tape 12 and disposed transversally thereon at the end of the tape 12 is a strip 20 of conductive material, such as aluminum foil.

The capstan 17 is formed integrally with and coaxial with a flywheel 21 which is driven in a counterclockwise direction as shown in FIG. 2 by a belt 22. The belt 22 passes a round and is driven by a drive shaft 23 of a synchronous motor 24 which has, as shown in FIG. 7, a low speed terminal 24*a* and high speed terminal 24*b* to change the speed thereof in accordance with an input applied to either the low speed terminal 24*a* or the high speed terminal 24*b* as in a conventional known manner.

A pinch roler 25 is positioned adjacent to the capstan 17. The tape 12 passes between the capstan 17 and pinch roller 25. The pinch roller 25 is rotatably mounted on a shaft 26 at one end of a crooked lever 27. The lever 27 is rotatably mounted on, and pivots about a pivot shaft 28, that is mounted in the baseboard 10. In the lever 27, near the other end thereof, there is formed an elliptical slot 27*a*. The slot 27*a* is engaged by a pin 29 which is attached to the end of a plunger 30 of a first solenoid 31, which is mounted on the baseboard 10. One end of a spring 32 is attached to the lever 27, to the side thereof opposite the plunger 30 and at a point near the slot 27*a*. The other end of the spring 32 is fixedly attached to a pin 33, which is mounted on a baseboard 10. When the first soleenoid 31 is not energized, the force of the spring 32 is unopposed, and the spring 32 causes the lever 27 to pivot about the pivot shaft 28 and take up a position in which the pinch roller 25 does not contact the tape 12 and capstan 17. When the first solenoid 31 is energized, the plunger 30 is drawn in, against the force of the spring 32, and causes the lever 27 to pivot and move the pinch roller 25 into close contact with the capstan 17. In this configuration, rotation of the capstan 17 causes the tape 12 to be driven forward in the direction A in FIG. 2.

The tape 12 also passes a first detector 34 and a second detector 35, which are for the purpose of detecting a detection strip 20 attached to the tape 12. The first detector 34 is positioned adjacent to the path of the tape 12 between the opening 10*a* and guide pulley 13, and is mounted on a support bracket 36, that is fixedly attached to the baseboard 10. The second detector 35 is positioned adjacent to the path of the tape 12 between the guide pulleys 15, 16, and is mounted on a support bracket 37, that is fixedly attached to the baseboard 10. The distance of the tape 12 between the first detector 34 and second detector 35 is arranged, for example, such that there are more 10 seconds of recording length left on the tape 12 when the strip 20 is detected by the first detector 34. This distance is easily calculated, since the length of the path of the tape 12, tape speed, and the locations of the second head 19 and first, second detectors 34, 35 are all known.

When the strip 20 reaches a position opposite the first detector 34, the first detector 34 sends out a signal causing a buzzer or similar device 38 to be actuated, to give a caller a warning that only a certain amount of recording time is left. When the strip 20 comes opposite the second detector 35, the second detector 35 sends out a signal which causes closing of a first detection circuit 39 for detecting each time the tape 12 has been run the complete length of one channel.

There is provided on the baseboard 10 a means for shifting the second head 19 to each succeeding track of the tape 12 after each succeeding message has been recorded, as in a known manner. The shifting means comprises, as shown in FIGS. 2 to 6, a head holder 40 which is slidable along guide bars 41, 42 fixedly mounted on the baseboard 10 and has a sliding pin 43 projected outwardly on the holder 40, a rotatory ring cam 44 of cylindrical shape having a plurality of notched steps 44*a*, 44*b* ... arranged in a circle each corresponding to one track 12*b*, 12*c* ... of the tape 12, the slidig pin 43 of the holder 40 being slidably put on and always pushed to one of the steps 44*a*, 44*b* ... by means of a spring 45 provided between the holder 40 and the baseboard 10, a ratchet wheel 46 having teeth 46*a*, 46*b* . . . each corresponding to a step of the cam 44 and associated with a spring plate 47 for stopping the wheel at the instant position, a knob 48 coaxially mounted on a shaft 49 together with the cam 44 and wheel 46, and a cam shift lever 50 having a claw 51 to be meshed with the teeth of the wheel 46 and operated by means of a mechainsm to be operated by a second solenoid 52 as mentioned later. When the second solenoid 52 is energized by a signal of the second detector 35, the wheel 46 is advanced by one pitch by the claw 51 of the lever 50 and, at the same time, the cam 44 is rotated by one step to slide the sliding pin 43 of the holder 40 downward by the spring 45, so that the second head 19 is shifted stepwise so as to face it to each succeeding track 12*b*, 12*c* . . . of the tape 12. Also, if the operator rotates the knob 48 at any direction when the claw 51 of the lever 50 is disengaged with tooth of the wheel 46, the second head 19 is shifted along widthwise direction of the tape 12, so that the cam 44 can be reset to the initial position by the rotation of the knob 48.

A mechanism for operating the lever 50 is explained hereinafter with reference to FIGS. 5 and 6. The second solenoid 52 is associated with a plunger 53 of which one end is rotatably attached to a crooked lever 54 which is rotatably mounted on a shaft 55 at its central portion. The other end of the lever 54 is rotatably mounted on the drive shaft 55 of a first pulley 56. Near to, and on the same plane as the first pulley 56, there is a small diameter portion 21*a* of a flywheel 21. The flywheel small diameter portion 21*a* is integrally mounted on the shaft 17*a* of a tape drive capstan 17. When the second solenoid 52 is not energized and the plunger 53 is not drawn therein, the configuration of the lever 54 is such that the first pulley 56 is held out of contact with the flywheel small diameter portion 21*a*. When the second solenoid 52 is energized in a manner described below, the plunger 53 is drawn therein, and, acting through the lever 54, causes the first pulley 56 to come into firm contact with the flywheel portion 21*a*. In this configuration, therefore, rotation of the capstan shaft 17*a* as well as causing rotation of the flywheel portion 21*a* also causes rotation of the first pulley 56.

The first pulley 56 is connected by a transmission belt 57 to a second pulley 58. That is, rotation of the first pulley 56 causes rotation of the second pulley 58. The second pulley 58 is rotatably mounted on a shaft 59, and comprises a large diameter portion 58*a* and a small diameter portion 58*b*. The transmission belt 57 is passed around the small diameter portion 58*b* of the second pulley 58. Projecting from the flat surface of the second pulley 58 there is a pin 60 which is for engagement of a slide lever 61. In the periphery of the large diameter portion 58*a* of the second pulley 58 there is a cut out notch 62.

Near to the outer periphery of the second pulley 58, and approximately tangential thereto, there is provided the cam shift lever 50 which is rotatably mounted on a shaft 63, on which the slide lever 61 is also rotatably mounted. The shaft 63 is positioned near one end of the cam shift lever 50, and at approximately the centre of the slide lever 61. The slide lever 61 is rotatably mounted at its one end on a shaft 64 fixedly provided on the baseboard 10 and crosses the cam shift lever 50 towards the second pulley 58 at the other end. At the other end of the cam shift lever 50 there is formed the pawl 51. The pawl 51 is for engagement and rotation of ratchet wheel 46. The ratchet wheel 46 is rotatably mounted on the shaft 49 of the knob 48 and is fixedly connected to a rotary cam 44, and therefore rotation of the ratchet wheel 46 causes rotation of the cam 44.

The cam 44 contacts the pin 43 of the head holder 40. The pin 43 controls the position of the second head 19 relative to the tape 12. The ratchet wheel 46 is moved one pitch at a time by the cam shift lever 50, and each time, the cam 44 is shifted a corresponding amount. Movement of the cam 44 acts through the pin 43 to move the second head 19 also a certain amount. The amount the head 19 is moved corresponds to the width of one track of the tape 12. There is also provided the knob 48, which can control movement of the cam 44, and is for the purpose of manually setting the position of the cam 44, and hence of the second head 19.

In addition, there is shown a smaller lever 65 that is positioned approximately parallel to the cam shift lever 50. One end of the lever 65 is adjacent to the outer periphery of the second pulley 58. At this end of the lever 65 there is a shaft 66 that is fixedly attached to the lever 65 and projects at right-angles therefrom. A rubber roller 67 is rotatably mounted on the shaft 66, and is in rolling contact with the outer periphery of the second pulley 58. At its other end, the lever 65 is rotatably mounted on a shaft 68. The shafts 66 and 68 are on opposite sides of the lever 65. One end of a compression spring 69 is attached to the lever 65 at a point near the shaft 68. The other end of the spring 69 is fixed on the baseboard 10, and the force of the spring 69 constantly acts to cause the lever 65 to pivot about the shaft 68 and take up a position in which the roller 67 is kept firmly pressed against the outer periphery of the second pulley 58. On the side of the lever 65 opposite the second pulley 58 there is formed a contact projection 70. Adjacent to this side there is also provided a solenoid switch 71, which closes the supply circuit to the second solenoid 52. The switch 71 is actuated by pressure on a button 71*a* which projects therefrom, and which is contacted by the projection 70 on the lever 65. When the roller 67 lies in the notch 62 in the periphery of the second pulley 58, the lever 65 is in a position in which the lever projection 70 does not contact the switch button 71*a*. But if the second pulley 58 is rotated so that the roller 67 contacts any portion of the outer periphery of the second pulley 58 other than the notch 62, the lever 65 is pushed towards the switch 71, and the projection 70 contacts the button 71*a*, thus closing the switch 71.

The slide lever 61 is rotatably mounted on the shaft 64 at its end that is further removed from the second pulley 58. Also, to this end there is attached one end of another compression spring 72. The other end of the spring 72 is attached to the end of the cam shift lever 50 near the second pulley 58, that is, to the opposite end to the pawl 51. In the slide lever 61 near its other end, that is, the end opposite to the shaft 64 end there is formed a slot 73, that lies on the longitudinal axis of the lever 61. The pin 60 on the surface of the second pulley 58 is slidably engaged in the slot 73. When the second pulley 58 rotates, the pin 60 also rotates and acts against the sides of the slot 73, and causes the slide lever 61 to pivot on the shaft 64 and move so that it draws the cam shift lever 61 tangentially with respect to the ratchet wheel 46. At the same time, the angle between the levers 50, 61 on the spring 73 side is increased, and so the cam shift lever 61 is moved into engagement with the ratchet wheel 46, and the ratchet wheel 46 is turned one pitch by the pawl 51.

Referring now to FIG. 7 which shows a block diagram in which components of this embodiment are electrically connected to each other, the tape 12 is run past the second detector 35 connected with the first detection circuit 39, which is for the purpose of detecting the detection strip 20. The first detection circuit 39 normally produces a steady output, which is supplied as input, as shown in FIG. 9*a*, to a JK flip-flop circuit 73. But when the strip 20 comes to the second detector 35, the output of the first detection circuit 39 is shorted by the strip 20, and therefore input to the JK flip-flop circuit 73 is 0. The strip 20 thus makes it possible to detect each time the tape 12 has been run the complete length of one channel.

The JK flip-flop 73 possesses J and K terminals to which a constant input of +5 Volt is applied, and a T input to which input from the first detection circuit 39 is supplied. In other words, the JK flip-flop 73 is controlled, or gated, by the first detection circuit 39. Output from one output terminal $\bar{Q}$ of the JK flip-flop 6, as shown with FIG. 9*b*, is supplied as input to a change-over circuit 74 and also to a first differentiating circuit 75. The circuit 74 comprises three set of relays 76, 77, 78 employed to effect recording and play back change-over to change the speed of the motor 24 which drives the tape drive capstan 17 and to actuate the warning circuit 38 of the first detector 34, respectively. The tape 12 is driven more slowly through the low speed terminal 24*a* when a message from a caller is being recorded than through the high speed terminal 24*b* when the previously recorded answer is being played back to the caller. Output from the first differentiating circuit 75 is supplied as input, as shown with FIG. 9*c*, to one input terminal X, of an RS flip-flop 79. Input to the other input terminal X2 of the RS flip-flop 79, as shown with FIG. 9(*e*), is provided by a second differentiating circuit 80.

Input to the second differentiating circuit 80, as shown with FIG. 9(*d*), is provided by a second detection circuit 81, which is for the purpose of detecting the telephone bell 82. The second detection circuit 81 provides an input to the second differentiating circuit 80 when the telephone bell 82 rings. A negative pulse to the terminal $X_2$ or a positive pulse to the terminal $X_1$ turns the RS flip-flop 79 on. A negative pulse to the terminal $X_1$ turns the RS flip-flop off. When the RS flip-flop 79 is on, it provides an actuating input to a supply circuit 83, as shown with FIG. 9(*f*). The supply circuit 83 supplies power for the tape drive motor 24, amplifier 84 with a pair of heads 18, 19 and first solenoid 31. When the RS flip-flop 79 is off, the supply circuit 83 cuts power off for both the amplifier 84 and first solenoid 31 immediately and, also, for the motor 24 after a short time defined by a delay circuit 85 for rotating the second pulley 58 when the second solenoid 52 is energized as mentioned hereinafter.

As shown in FIG. 8, the second solenoid 52 is in series with a power supply 86. The supply circuit 86 to the second solenoid 52 also includes two normally open switches 71, 87 in parallel. The supply circuit 86 is closed and the second solenoid 52 is energized when either of the two switches 71, 87 is closed. The switch 87 is in contact of a relay 88. The relay 88 is connected to the collector of an NPN transistor 89 in a circuit which also includes terminals 90, a third differentiating circuit 91, and a monostable multivibrator 92. The terminals 90 are connected with the first differentiating circuit 75. Each time output from the first differentiating circuit 75 is supplied as input to the terminals 90, a shorted output pulse is provided to the third differentiating circuit 91 which differentiates this pulse and provides an input to the monostable multivibrator 92 which supplies a bias voltage to the base of the transistor 89. The transistor 89 conducts, and so picks up the relay 88, which closes the switch 87 for a short time until the switch 71 is closed. The second solenoid 52 is therefore energized by closing of the switch 87. When the second solenoid 52 is energized the plunger 53 is drawn in, thus bringing the first pulley 56 into contact with the flywheel portion 21*a* mounted on the capstan shaft 17*a*, and is rotated thereby. Rotation of the first pulley 56 causes rotation of the second pulley 58. As the second pulley 58 rotates, it moves the notch 62 away from the roller 67. The lever 65 is pushed towards and closes the switch 71. The second solenoid 52 is thus kept energized until the second pulley 58 completes one revolution and the notch 62 is again brought to the location of the roller 67.

Accordingly, the second solenoid 52 is energized by closing of the switch 87 when the output of the first differentiating circuit 75 is supplied to the terminals 90 and disenergized by opening of the switch 71 when the roller 67 is dropped into the notch 62 of the second pulley 58, while the switch 71 is closed upon energization of the second solenoid 52. Also in this time, the flywheel 46 is turned one pitch and the second head 19 is therefore moved to the next succeeding channel for recording the next message. Since the second head 19 is moved only one track at a time, and one complete track is used for the recording of each single message, there is also the advantage that the position of the second head 19, that is, the position of the knob 49 indicates as shown in FIG. 4, the number of messages received. That is, the displayed track number showing the track at which the second head is positioned corresponds exactly to the number of messages recorded. It is thus possible to know beforehand the exact number of messages that may be taken on a tape 12.

Operation of this embodiment constructed as above-described is as follows. Initially, that is when no telephone call is being made, both the switches 71, 87 are open, the roller 67 is in the notch 62 of the second pulley 58, and the first pulley 56 is not in contact with the flywheel small diameter portion 21*a*. When the telephone bell 82 rings, the bell detection circuit 81 is actuated and produces an output which is supplied to the second differentiating circuit 80. The second differentiating circuit 80 provides a negative input pulse to the terminal $X_2$ of the RS flip-flop 79. This turns the RS flip-flop 79 on, and the flip-flop 79 actuates the supply circuit 83 which in turn actuates the motor 24, amplifier 84 for the heads 18, 19 and first solenoid 31.

The tape 12 is now driven, and the recorded answer on the first track 12*a* of the tape 12 is played to the caller through the first head 18. When the tape 12 has been driven once over its whole length, the conductive strip 20 comes into a position in which it is detected by the second detector 35 of the first detection circuit 39. Output from the first detection circuit 39 momentarily goes to O, with the result that the JK flip-flop 73 toggles. The $\bar{Q}$ output of the JK flip-flop 73 is now 1. This output is supplied to the first differentiating circuit 75. The 1st differentiating circuit 75 supplies a positive pulse to the terminal $X_1$ of the RS flip-flop 79. But the flip-flop 79 is already on, and is therefore unaffected by this input.

Also the supply circuit 83 is still operative, and the tape 12 continues to be driven. However, output from the JK flip-flop 73 is also supplied to the changeover circuit 74. Upon operation of the changeover circuit 74 three sets of relays 76, 77, 78 are actuated at the same time. At this moment, the speed of the motor 24 at which the tape 12 is substantially driven is changed from the high speed to the low speed, the employment of the heads 18, 19 by which the tape 12 is reproducing and recording is changed from the first head 18 to the second head 19, and the warning circuit 38 of the first detector 24 is actuated. Therefore, the caller may record a message through the second head 19 on the tape 12 which is driven by the motor 24 more slowly during recording of a message than during playback of the automatic answer.

While the tape 12 is being thus driven, the caller may record a message. When the tape 12 has been driven over almost the whole length of the track made available to the caller for recording a message, the detection strip 20 comes opposite the first detector 34, and actuates the warning circuit 38 by which the caller is given a warning that there is only a certain amount of time left for recording the message.

When the tape 12 has been driven completely around once more, the coductive strip 20 thereon is once again detected by the second detector 35 of the first detection circuit 39. Output from the first detection circuit 39 again momentarily goes to 0. Therefore, the JK flip-flop 73 again toggles, and the $\overline{Q}$ output thereof goes to 0, and causes the changeover circuit 74 to revert to its original state, i.e., the state in which it effects playback and a high motor speed. The $\overline{Q}$ output is also supplied to the first differentiating circuit 74. In response, the first differentiating circuit 74 supplies a negative pulse to the terminal $X_1$ of the RS flip-flop 79. This turns the flip-flop 79 off, and the supply circuit 83 is no longer actuated. Therefore, both the amplifier 84 for the heads 18, 19 and first solenoid 31 are turned off and, then, the tape 12 is stopped immediately to cease the recording and reproducing. Also, the motor 24 is stopped after rotating the second pulley 58 by one revolution for shifting the second head 19 to the next step on the cam 44. Then, the motor 24 is automatically turned to the original position in which it is connected from the high speed terminal 24*a* to the relay 76. Accordingly, the system is now in its original state again and ready for the next telephone call.

As is clear from the above description, in an automatic telephone answering system according to the present invention, a single tape is used for playing an answer and recording messages, one track being used for the answer, and one complete track being made available for each message. Tape speed during recording of messages is made a fraction (e.g., ½, ⅓, ⅔) of tape speed during playback of an answer. In other words, on the same tape, and with the same length of tape, that is, the length of one complete track the time available for messages can be made 1.5, 2 or 3 times the time required for playing an answer. In addition thereto, by the provision of a tape position detection means according to the invention, a caller may be given an indication of the amount of time left for recording a message. The means of the invention comprises a strip of detectable material on a magnetic tape and first and second detectors, and the time of the warning can be easily set to any required time before the end of a track. Thus, by a simple, inexpensive means, the automatic telephone answering system of the invention provides considerable advantages in running, in economy and in function.

Although the present invention has been fully described by way of example, it is to be noted that, without departing from the true scope of the present invention, various changes and modifications are apparent to those skilled in the art. For example, both of the first and second detectors may be arranged in the same position if the tape has a pair of strips of conductive material each being spaced at certain distance to the other, as shown in FIGS. 10, 11.

In this embodiment, the first and second detectors 34′, 35′ are both mounted on a support bracket 93 which is fixedly attached to the baseboard 10. On the back surface of the tape 12 there are attached a first detection strip 94 and a second detection strip 95, which are made of material such as aluminum. The first detection strip 94 is attached to the side of the back surface of the tape 12, which passes by the first detector 34′, and the second detection strip 95 is attached to the side that passes the second detector 35′. In other words, the strips 94, 95 are positioned on opposite side of the longitudinal axis of the tape 12. The second detection strip 95 is positioned near the end of the tape 12, that is, near the end of tracks made available for recording, and the first detection strip 94 is attached to a point some distance before end ed of the tape 12. In other words, when the tape 12 is run the first detection strip 94 is detected by the first detector 34′ before the second detection strips 95 is detected by the second detector 35′. The time that elapses between detection of the first and second detection strips 94, 95 depends, of course, on tape speed and on the distance between the strips 94, 95, and is easily adjustable in consideration of these two factors. When the first detection strip 94 is detected, the first detector 34′ sends out a signal which activates a buzzer, or similar device 38, to give a warning to a caller that only a certain amount of time is left for recording a message. When the second detection strip 95 is detected, the second detector 35′ sends out a signal causing power to the first solenoid 31 to be cut.

In another embodiment of the present invention, a first detection strip is attached to one surface of the tape, and a second detection strip is attached to the opposite surface thereof. Both strips lie on the longitudinal axis of the tape, the second detection strip being near the end of the tape and the first detection strip being some distance before the end of the tape. The first and second detection strips are detected by first and second detectors 34′, 35′ respectively. The detectors 34′, 35′ are supported on opposite arms of a yoke-like support, which is fixedly attached to the baseboard.

Therefore, such changes and modifications should be construed as included therein unless otherwise they depart therefrom.

What is claimed is:

1. An automatic telephone answering system employing a multichannel, endless magnetic tape traveling along a path and having one channel for the playback of a previously recorded answer to callers and a plurality of channels for the recording of messages from callers, comprising: a variable speed tape drive means for driving said tape and operatively connected thereto, said tape drive means comprised of a variable speed motor; first detection means for detecting each completion by said endless magnetic tape of a complete cycle of travel around its first path, said first detection means comprised of a detector operatively positioned adjacent the path of said endless magnetic tape for detecting completion of each cycle of travel of said tape, a first detection circuit coupled to said detector, said first detection circuit normally producing an output, said output terminating in respnse to a detection by said detector, and a first JK flip-flop coupled to said first detection circuit and gated thereby;

a speed control means operatively connected to said first detection means and said tape drive means, said speed control means being responsive to said first detection means for changing the speed at which said tape drive means said endless magnetic tape, for causing said endless magnetic tape to be driven more slowly during recording of messages than during playback of the previously recorded answer, said speed control means comprised of a changeover circuit coupled to said J-K flip-flop, said changeover circuit including three relays, a first relay being coupled to said variable speed motor for switching said motor from high speed to low speed and normally positioned for high speed operation, a second relay being coupled to recording and reproducing heads and normally to said reproducing head and adapted for switching to said recording head upon activation of said second relay upon completion of a first cycle of tape travel, and a third relay coupled to a warning circuit;

second detection means connected to a telephone for detecting an incoming telephone call and producing an output indicative thereof, said second detection means including a second detecting circuit coupled to the telephone line and producing an output signal in response to an incoming telephone call, a first differentiating circuit coupled to said second detecting circuit and producing an output in response to the output signal from said first detecting circuit, an RS flip-flop having inputs and and an output, one of said inputs coupled to said first differentiating circuit, a second differentiating circuit coupled between an input of said RS flip-flop and the output of said JK flip-flop, whereby output from said first differentiation circuit turns said RS flip-flop on;

power supply means connected to said variable speed tape drive means and said second detection means for supplying power to said tape drive means in response to an incoming call, said tape drive means being initially in a fast speed mode of operation; and speed changing means connected to said second detection means, said variable speed tape drive means and said power supply means for changing the speed of said tape drive means to a slow speed mode of operation in response to the detection of a first complete tape cycle by said detection means, and for returning said tape drive means to the fast speed mode of operation and for deactivating said power supply means in response to the detection of a second complete tape cycle by said detection means, said speed changing means comprised of a third differentiating circuit coupled to said second differentiating circuit, a monostable multivibrator coupled to said third differentiating circuit, a relay coupled to said monostable multivibrator, a solenoid coupled to said relay and to said variable speed control means, a switch coupled to said solenoid and a pulley coupled to said switch, said pulley adapted to shift said recording head to a next track on the tape.

* * * * *